United States Patent
Klose et al.

(10) Patent No.: US 10,056,085 B2
(45) Date of Patent: Aug. 21, 2018

(54) SPEECH RECOGNITION ON BOARD OF AN AIRCRAFT

(71) Applicant: Airbus Operations GmbH, Hamburg (DE)

(72) Inventors: Peter Klose, Hamburg (DE); Michael Luedtke, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 0 days.

(21) Appl. No.: 15/184,302

(22) Filed: Jun. 16, 2016

(65) Prior Publication Data

US 2016/0372117 A1    Dec. 22, 2016

(30) Foreign Application Priority Data

Jun. 18, 2015  (EP) .................................. 15172677

(51) Int. Cl.
| | |
|---|---|
| *G10L 15/00* | (2013.01) |
| *G10L 17/06* | (2013.01) |
| *G10L 15/26* | (2006.01) |
| *G10L 17/00* | (2013.01) |
| *G10L 15/06* | (2013.01) |
| G10L 15/22 | (2006.01) |
| B64D 11/00 | (2006.01) |

(52) U.S. Cl.
CPC ............ *G10L 17/06* (2013.01); *G10L 15/063* (2013.01); *G10L 15/22* (2013.01); *G10L 15/26* (2013.01); *G10L 17/00* (2013.01); *B64D 11/0015* (2013.01); *G10L 2015/0635* (2013.01); *G10L 2015/227* (2013.01)

(58) Field of Classification Search
USPC .................................. 704/231–257, 270–275
See application file for complete search history.

(56) References Cited

U.S. PATENT DOCUMENTS

| | | | |
|---|---|---|---|
| 2002/0091517 A1 | 7/2002 | Frank et al. | |
| 2006/0095249 A1 | 5/2006 | Kong et al. | |
| 2008/0082332 A1 | 4/2008 | Mallett et al. | |
| 2008/0195389 A1 | 8/2008 | Zhang et al. | |
| 2008/0201148 A1* | 8/2008 | Desrochers | ................... 704/257 |
| 2012/0253811 A1* | 10/2012 | Breslin | ................... G10L 17/00 |
| | | | 704/249 |
| 2016/0352412 A1* | 12/2016 | Di Costanzo | ........... H04L 67/12 |

FOREIGN PATENT DOCUMENTS

GB    2489489    10/2012

OTHER PUBLICATIONS

European Search Report, dated Dec. 15, 2015, priority document.
"Wearable Technology, Soon in a Cabin Near You", Oct. 21, 2014.
"Recongnising speakers from the topics they talk about", Doris Baum, Jun. 12, 2012.

* cited by examiner

*Primary Examiner* — Jesse Pullias
(74) *Attorney, Agent, or Firm* — Greer, Burns & Crain, Ltd.

(57) ABSTRACT

A method of performing speech recognition on board an aircraft, a computer program for executing the method, as well as a speech recognition unit for performing speech recognition on board an aircraft. The method comprises receiving a speech signal spoken by a user; performing speaker recognition on the speech signal to identify the user from the speech signal; selecting a speech recognition user profile which is associated with the identified user; and performing speech recognition on the speech signal using the selected user profile.

7 Claims, 2 Drawing Sheets

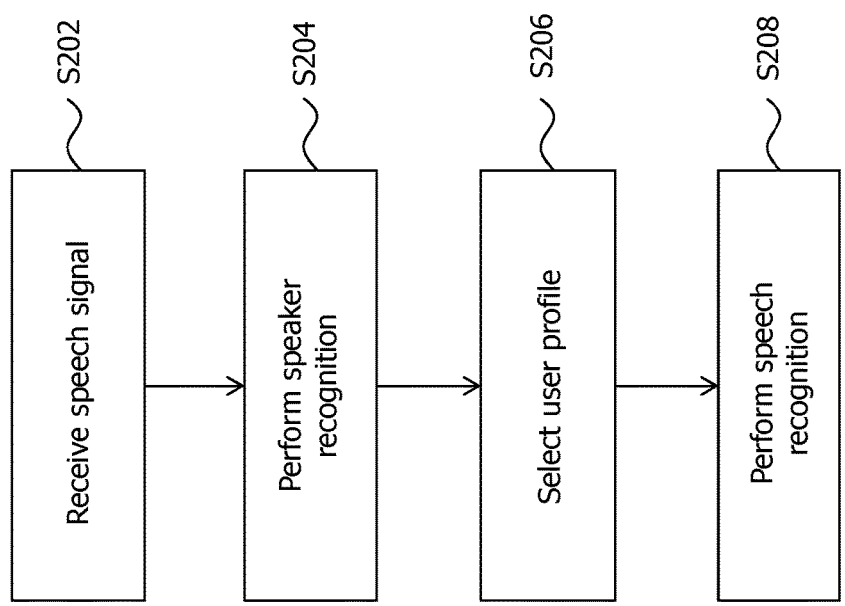

SPEECH RECOGNITION ON BOARD OF AN AIRCRAFT

CROSS-REFERENCES TO RELATED APPLICATIONS

This application claims the benefit of the European patent application No. 15172677.5 filed on Jun. 18, 2015, the entire disclosures of which are incorporated herein by way of reference.

BACKGROUND OF THE INVENTION

The present disclosure generally relates to performing speech recognition on board of an aircraft. More particularly, the present disclosure relates to a method for performing speech recognition on board of an aircraft, to a computer program for executing the method, as well as to a speech recognition unit for performing speech recognition on board of an aircraft.

Speech recognition—also known as "Speech-to-Text" (STT)—techniques have been developed over the last decades to provide computer-implemented assistance for translating spoken language into text and have nowadays been adopted in many fields as an effective means to improve work efficiency.

Speech recognition systems may generally be classified into speaker-independent and speaker-dependent systems. Speaker-independent systems are typically usable out-of-the-box and do not require performing user-based training before they are ready to use. These systems generally support a limited vocabulary only. Speaker-dependent systems, on the other hand, require performing user-based training before their effective use. In such training, a user's specific voice is analyzed and used to fine-tune the recognition of the particular user's speech, finally resulting in a more accurate transcription. Speaker-dependent systems generally support large vocabularies suitable for translating spoken natural language into full text.

Results of a user-based training may be stored into a user profile which may include, for example, voice and/or pronunciation characteristics of a particular user, a vocabulary characteristic to the particular user as well as probabilities of occurrences of words in the language commonly used by the user.

In speaker-dependent speech recognition systems, the user is required to select a user profile before the actual translation of spoken language may begin. Due to the information stored in the user profile, speech recognition may be performed taking into account the user-specific characteristics which finally improves the recognition rate, i.e., the percentage of correctly recognized words from the speech signal.

"Speech recognition" is generally to be distinguished from "speaker recognition."

Speaker recognition relates to the identification of a person from characteristics of the person's voice. Speaker recognition systems may be used for speaker verification or speaker identification. In speaker verification, the voice of a user who claims to be of a certain identity is used to verify the claimed identity. In speaker identification, on the other hand, a user's voice is used to determine a previously unknown identity of the user. Roughly speaking, therefore, speech recognition relates to recognizing "what" is being said and speaker recognition relates to recognizing "who" is speaking.

Similar to the user-based training applied in speaker-dependent speech recognition systems, speaker recognition systems typically enforce a so-called enrollment phase. During enrollment, the user's voice is recorded and a number of features are extracted to form a voice print. During verification, a speech sample is then compared against previously created voice prints.

Speaker recognition systems may be classified into text-dependent systems, for which the text for enrollment and verification is the same (e.g., given by a common pass phrase), and text-independent systems, for which the text for enrollment and verification is generally different and the user's identity is thus determined based on common voice analysis techniques.

In both speech recognition and speaker recognition, various techniques may be used to process and store voice and pronunciation characteristics of a user including frequency estimation, Hidden Markov models, neural networks, pattern matching algorithms, Gaussian mixture models, or the like.

SUMMARY OF THE INVENTION

It is an object of the present disclosure to provide a technique that allows employing speech recognition techniques on board of an aircraft in an effective manner.

According to a first aspect, a method of performing speech recognition on board of an aircraft is provided. The method comprises receiving a speech signal spoken by a user, performing speaker recognition on the speech signal to identify the user from the speech signal, selecting a speech recognition user profile which is associated with the identified user, and performing speech recognition on the speech signal using the selected user profile.

Thus, before effectively beginning to perform speech recognition on the received speech signal, a speech recognition user profile may be selected. The user profile may be used to implement a speaker-dependent speech recognition technique, as described above. The user profile may include user-specific speech characteristics, such as at least one of voice characteristics of the user, pronunciation characteristics of the user, a vocabulary characteristic to the user (e.g., characteristic words, phrases and/or other often used formulations), and probabilities of occurrences of words, phrases and/or formulations in the language commonly used by the user. Such information may have been stored into the user profile by conducting a user-specific training in advance.

Further, before effectively selecting the user profile, speaker recognition is performed on the speech signal in order to identify the user who is actually speaking. The user profile is then selected in accordance with the identified user. Thus, rather than selecting the user profile manually, the user profile is selected in accordance with the identified user automatically, i.e., based on automatic user identification. Such approach is particularly advantageous because it allows selecting and applying user profiles on-the-fly while speech input is ongoing. There is no need to select a user profile by hand before actually commencing to speak.

The user may be a member of a cabin crew of the aircraft, such as, for example, a flight attendant, a purser, or a pilot, who uses speech recognition functionality provided on board of the aircraft to execute a desired function. Speech recognition functionality may be provided for various purposes on the aircraft.

In one implementation, speech recognition may be used for generating messages that may be displayed to passengers seated in the cabin of the aircraft. In this case, performing speech recognition may include converting the speech signal into a text message to be displayed to at least one passenger in the cabin of the aircraft. For example, speech recognition may be performed on a speech signal that is transmitted as an audio announcement to passengers via loudspeakers installed in the cabin of the aircraft (e.g., using the so-called Passenger Address, PA, system). A text message thus generated may form a simultaneous textual representation of the audio announcement and may be provided to passengers in addition to the audio announcement itself. The text message may be displayed via the in-flight entertainment system on respective display screens, for example. Also, the text message may be sent to passenger-owned devices, such as mobile phones, smartphones, or laptops of passengers, which have established connectivity to an onboard connectivity system. This may be particularly helpful for deaf or hearing-impaired passengers who otherwise might not take note of an announcement currently being made. Passenger-owned devices may be required to register for such notification service in advance.

In another implementation, speech recognition may be used for inputting control commands used to control functions of an aircraft cabin management system. In this case, performing speech recognition may include converting the speech signal into a control command used to control a cabin management system of the aircraft. Cabin management systems (also called Cabin Intercommunication Data Systems, CIDS, in Airbus aircrafts), generally allow operating and monitoring cabin related functions provided to both passengers and the crew including, for example, controlling the cabin temperature, controlling the cabin illumination, controlling emergency and evacuation signaling, controlling the in-flight entertainment system, making passenger announcements using the PA, and making crew-internal calls. A flight attendant may thus use speech recognition functionality in order to input a control command to the cabin management system, such as "cabin light on/off" in order to control the cabin illumination, for example.

In one variant, speaker recognition may be performed on a first portion of the speech signal and speech recognition may be performed on a remaining portion of the speech signal. Thus, the first portion of the speech signal may be used to identify the user only and the remaining portion may be subject to actual speech recognition. In one such variant, the first portion of the speech signal may correspond to an identification phrase of the user, e.g., a passphrase or a spoken name which uniquely identifies and/or authenticates the user. Such variant corresponds to an implementation of a text-dependent speaker recognition system, as described above.

In another variant, speaker recognition may be performed on a first portion of the speech signal and speech recognition may be performed on the first portion of the speech signal and a remaining portion of the speech signal.

In one such variant, the first portion may be used to identify the user and, upon successfully identifying the user, speech recognition may be performed retrospectively beginning from the first portion and continuing with the remaining portion of the speech signal. Thus, speech recognition may be performed on the received speech signal in its entirety, i.e., including the first portion and the remaining portion. This variant is particularly advantageous because it allows the user to just start speaking (i.e., without having to take care of identifying him or herself using an identification command, or the like) while it is made sure that the entire received speech signal is processed from the very beginning using speaker-dependent speech recognition employing a user profile, thus, yielding high recognition rates for the entirety of the received speech signal. Such variant corresponds to an implementation of a text-independent speaker recognition system, as described above.

In an alternative such variant, the first portion may be used to identify the user and speech recognition may be performed on the first portion already before the user has been identified. Upon successfully identifying the user, speech recognition may be performed on the remaining portion of the speech signal employing a correspondingly selected user profile. As compared to the previous variant, recognition rates may be lower for the first portion of the speech signal, i.e., as long as the user has not yet been successfully identified and a corresponding user profile has not yet been selected.

The user profile to be selected has to be accessible on board the aircraft. To this end, the method may further comprise downloading, prior to receiving the speech signal, a plurality of speech recognition user profiles from a remote source, wherein the selected user profile is selected among the plurality of speech recognition user profiles. For example, user profiles associated with the cabin crew members of a particular flight may be downloaded from the remote source in advance of the flight. Alternatively, the method may further comprise downloading the selected user profile from a remote source. In this case, only a single user profile is downloaded upon request. In both of the above variants, the remote source may be a remote server hosted by an airline which provides speech recognition user profiles of airline crew members for download. The download may be carried out via an Internet connection, for example.

Speaker recognition may be performed based on speaker recognition data (e.g., generated in an enrollment phase, as described above). The speaker recognition data may include at least one of voice characteristics of the user, pronunciation characteristics of the user, a vocabulary characteristic to the user (e.g., characteristic words, phrases and/or other often used formulations), and probabilities of occurrences of at least one of words, phrases and formulations in the language commonly used by the user. Particularly, the speaker recognition data may be updated while performing speech recognition on the speech signal. In this way, continuous optimization of speaker recognition may be achieved, for example, by continuously optimizing previously stored characteristics and adding further characteristics if needed, thus, implementing a self-learning speaker recognition technique.

More particularly, speaker recognition may be performed based on a vocabulary limited to terms relating to the cabin or situations around the cabin of the aircraft, e.g., the vocabulary may be limited to words, phrases and/or formulations used in typical cabin announcements. The same applies to speech recognition. In this way, only a limited number of words is used for speaker and/or speech recognition which generally facilitates the recognition process and improves the quality of recognition. In one such variant, the vocabulary may be specific to at least one of a user and a user group. User group specific vocabularies may reflect a particular set of words, phrases and/or other formulations typically used by certain user groups, such as pilots or flight attendants, for example. User specific vocabularies, on the other hand, may reflect a particular set of words, phrases and/or other formulations typically used by an individual user. For example, one flight attendant may use a certain vocabulary for cabin announcements under his or her responsibility, whereas another flight attendant may typically use a different vocabulary for announcements under his or her responsibility. For speaker recognition, for example, the recognized words, phrases and/or formulations may be matched to vocabularies stored in the speaker recognition data of individual users and, accordingly, a user that turns out to have the highest match may be determined as the identified user.

According to a second aspect, a computer program product is provided. The computer program product comprises program code portions for carrying out one or more of the steps of any of the method aspects described herein, when the computer program product is run or executed on a computer system or on one or more computing devices. The computer program product may be stored on a computer readable recording medium, such as a permanent or rewritable memory.

According to a third aspect, a speech recognition unit for performing speech recognition on board of an aircraft is provided. The speech recognition unit comprises a receiving component configured to receive a speech signal spoken by a user, a speaker recognition component configured to perform speaker recognition on the speech signal to identify the user from the speech signal, a selecting component configured to select a speech recognition user profile which is associated with the identified user, and a speech recognition component configured to perform speech recognition on the speech signal using the selected user profile.

All of the aspects described herein may be implemented by hardware circuitry and/or by software. Even if some of the aspects are described herein with respect to the speech recognition unit, these aspects may also be implemented as a method or as a computer program for performing or executing the method. Likewise, aspects described as or with reference to a method may be realized by suitable components in the speech recognition unit, or by means of the computer program.

BRIEF DESCRIPTION OF THE DRAWINGS

In the following, the present disclosure will further be described with reference to exemplary implementations illustrated in the figures, in which:

FIG. 2 schematically illustrates a flowchart of a method which may be performed by the speech recognition unit of FIG. 1.

DETAILED DESCRIPTION OF THE PREFERRED EMBODIMENTS

Figure 1:
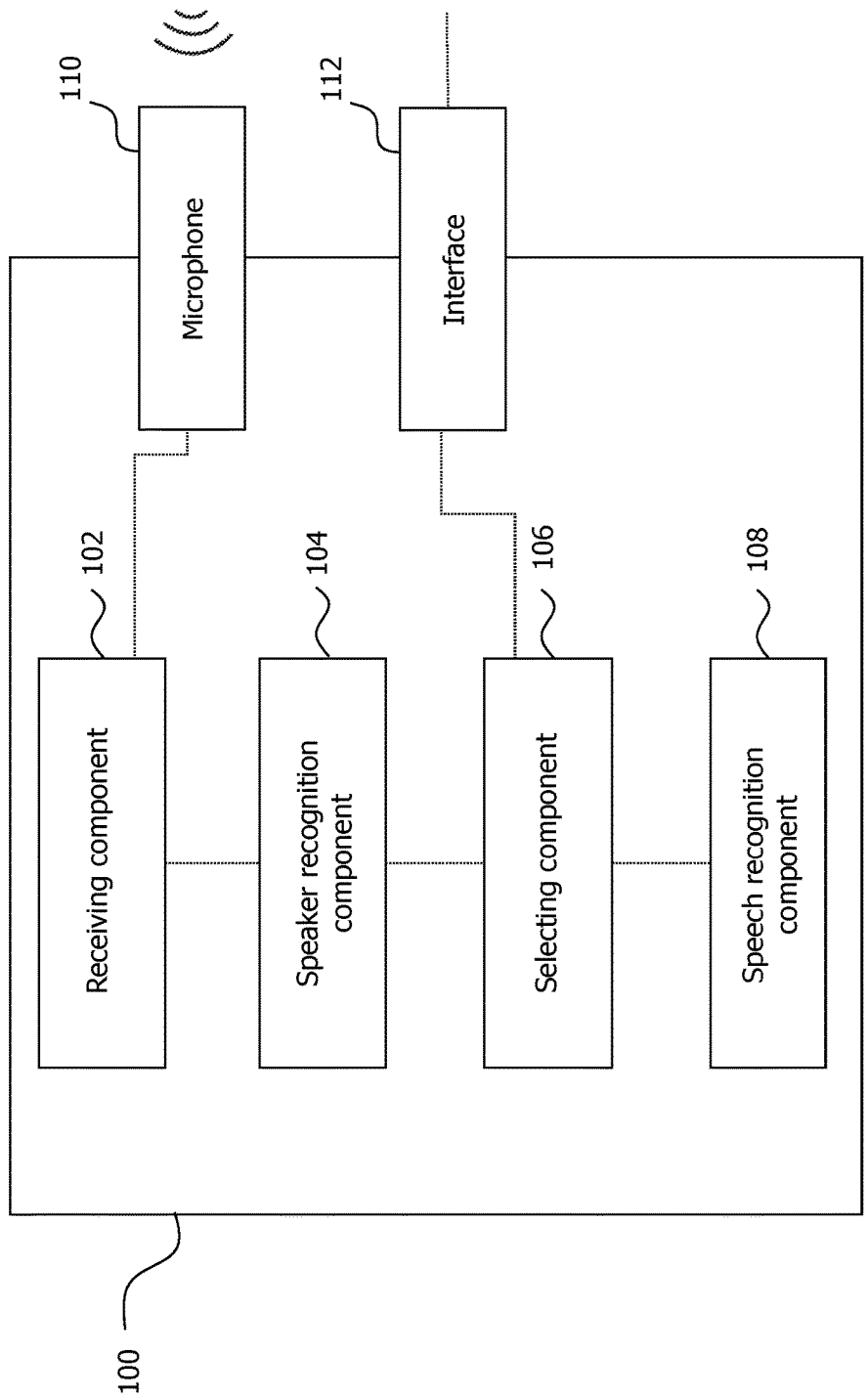
FIG. 1 schematically illustrates a composition of a speech recognition unit.

Before describing invention embodiments in detail, it will be appreciated that the present invention may be embodied in a method, a system or a program product including executable instructions stored in a non-transitory memory or medium. Further, a method of the invention may be carried out by a system of the invention which may include one or more computers executing a program product of the invention. Accordingly, it will be appreciated that in considering a particular method, system or program product embodiment, description of other suitable embodiments may be had. Illustration of a method embodiment, for example, may be useful to also illustrate a program product or system that carries out the method, and vice-versa.

In the following description, for purposes of explanation and not limitation, specific details are set forth in order to provide a thorough understanding of the present disclosure. It will be apparent to one skilled in the art that the present disclosure may be practiced in other implementations that depart from the specific details. Those skilled in the art will further appreciate that functions explained herein below may be implemented using individual hardware circuitry, using software functioning in conjunction with a programmed microprocessor or a general purpose computer, using an application specific integrated circuit (ASIC) and/or using one or more digital signal processors (DSPs). It will also appreciated that when the present disclosure is described as a method, it may also be embodied in a device (e.g., the speech recognition unit described herein below), a computer processor and a memory coupled to a processor, wherein the memory is encoded with one or more programs that perform the methods disclosed herein when executed by the processor.

FIG. 1 schematically illustrates an exemplary composition of a speech recognition unit 100 and FIG. 2 schematically illustrates a corresponding flowchart of a method which may be performed by the speech recognition unit 100. The basic operation of the speech recognition unit 100 will be described in the following with reference to both FIGS. 1 and 2.

The speech recognition unit 100 may be integrated—e.g., as a software or hardware component—into one or more existing systems provided in an aircraft and supplement these systems by providing speech recognition functionality that may be used to execute desired functions of these systems and/or extend the functionalities of these systems by adding additional functions. For example, the speech recognition unit 100 may be integrated into a cabin management system of the aircraft and may be used to control functions of the cabin management system using voice commands. It will be understood that other implementations of the speech recognition unit 100 are conceivable. For example, the speech recognition unit 100 may be provided as a standalone unit that may communicate, e.g., via a network, with other systems or entities provided in the aircraft and trigger execution of functions provided by these systems.

As one example, the speech recognition may be used for inputting voice control commands in order to control functions of an aircraft cabin management system (e.g., the so-called Cabin Intercommunication Data System, CIDS). Exemplary voice control commands may include commands for controlling the cabin temperature, controlling the cabin illumination, controlling the in-flight entertainment system, or controlling emergency and evacuation signaling.

As another example, speech recognition may be used for generating text messages that may be displayed to passengers seated in the cabin of the aircraft. For example, speech recognition may be performed on a speech signal that is transmitted as an audio announcement to passengers via loudspeakers installed in the aircraft cabin (e.g., via the so-called Passenger Address, PA, system). A message thus generated may be provided to passengers as a simultaneous textual representation of the audio announcement which may be displayed via the in-flight entertainment system on respective display screens, for example.

The speech recognition unit 100 comprises a receiving component 102, a speaker recognition component 104, a selecting component 106, and a speech recognition component 108. These components are described in the following in detail.

The receiving component 102 is configured to receive, in step S202, a speech signal spoken by a user. The user may be a member of the aircraft cabin crew, such as, for example, a flight attendant, a purser, or a pilot, who desires to execute a particular function of an aircraft system using speech recognition. The speech signal spoken by the user is recorded by a respective microphone 110 which may be provided, for example, but not limited thereto, at a flight attendant panel installed in the aircraft cabin.

The speaker recognition component 104 is configured to perform speaker recognition, in step S204, on the received speech signal to identify the user from the speech signal. In other words, the speaker recognition component 104 identifies the user who is actually speaking. Speaker recognition may be performed based on speaker recognition data (e.g., generated in an enrollment phase in advance, as described above), wherein the speaker recognition data may include voice and/or pronunciation characteristics of the user, a vocabulary characteristic to the user (e.g., characteristic words, phrases and/or other often used formulations), as well as probabilities of occurrences of words, phrases and/or formulations in the language commonly used by the user. More particularly, speaker recognition may be performed based on vocabularies limited to terms relating to the cabin or situations around the aircraft cabin, e.g., vocabularies that are limited to words, phrases and/or formulations used in typical cabin announcements.

The selecting component 106 is configured to select, in step S206, a speech recognition user profile which is associated with the identified user. Thus, the user profile is selected in accordance with the identified user automatically, i.e., based on automatic user identification performed on the received speech signal. This is particularly advantageous because it allows selecting and applying user profiles on-the-fly while speech input is ongoing. There is no need to select a user profile by hand before actually commencing to speak.

The selected user profile may be stored in a respective storage device accessible by the speech recognition unit 100 and, thus, the user profile may be applied immediately upon selection. In case the selected user profile is not available to the speech recognition unit 100, it may be downloaded from a remote source, such as a remote server hosted by an airline which provides user profiles of airline crew members for download. The download may be carried out via an Internet connection established using a network interface 112 provided at the speech recognition unit 100, for example. Alternatively, a plurality of speech recognition user profiles may be downloaded from the remote source beforehand and the selected user profile may be selected among the plurality of downloaded speech recognition user profiles accordingly.

The speech recognition component 108 is configured to perform speech recognition, in step S208, on the speech signal using the selected user profile. The user profile (e.g., generated in a user-specific training in advance) may include voice and/or pronunciation characteristics of the user, a vocabulary characteristic to the user (e.g., characteristic words, phrases and/or other often used formulations), as well as probabilities of occurrences of words, phrases and/or formulations in the language commonly used by the user. The user profile is thus used to implement a speaker-dependent speech recognition technique, as described above.

As regards the received speech signal, speaker recognition may be performed on a first portion of the speech signal and speech recognition may be performed on a remaining portion of the speech signal. The first portion may correspond to an identification phrase of the user, e.g., a passphrase or a spoken name which uniquely identifies and/or authenticates the user. Alternatively, speaker recognition may be performed on a first portion of the speech signal and speech recognition may be performed on the first portion of the speech signal and a remaining portion of the speech signal. Thus, the first portion may be used to identify the user and, upon successfully identifying the user, speech recognition may be performed retrospectively beginning from the first portion and continuing with the remaining portion of the speech signal. Such approach is particularly advantageous because it allows the user to just start speaking while it is made sure that the entire received speech signal is processed from the very beginning using speaker-dependent speech recognition employing a user profile, thus, featuring high recognition rates for the entirety of the received speech signal. A further advantage is given in that a plurality of users, e.g., a plurality of members of the cabin crew, can easily take turns in using the speech recognition unit 100. A new user simply needs to start speaking and the corresponding user profile is applied automatically, still making sure that the received speech signal is properly processed in its entirety.

It is believed that the advantages of the technique presented herein will be fully understood from the foregoing description, and it will be apparent that various changes may be made in the form, constructions and arrangement of the exemplary aspects thereof without departing from the scope of the disclosure or without sacrificing all of its advantageous effects. Because the technique presented herein can be varied in many ways, it will be recognized that the disclosure should be limited only by the scope of the claims that follow.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method of performing speech recognition on board of an aircraft, comprising:
downloading a plurality of speech recognition profiles from a remote source providing user profiles of airline crew members;
receiving a speech signal spoken by a user being one of the airline crew members;
performing speaker recognition on the speech signal to identify the user from the speech signal;
selecting, among the downloaded plurality of speech recognition profiles, a speech recognition user profile which is associated with the identified user; and
performing speech recognition on the speech signal using the selected user profile;
wherein speaker recognition is performed on a first portion of the speech signal to identify the user and speech recognition is performed using the selected user profile retrospectively beginning from the beginning of the first portion of the speech signal and continuing with a remaining portion of the speech signal;

wherein performing speech recognition comprises converting the speech signal into a text message to be displayed to at least one passenger in a cabin of the aircraft; and wherein the text message is sent to a passenger-owned device which has established connectivity to an onboard connectivity system.

2. The method of claim 1, wherein speaker recognition is performed based on speaker recognition data, the speaker recognition data including at least one of voice characteristics of the user, pronunciation characteristics of the user, a vocabulary characteristic to the user, and probabilities of occurrences of at least one of words, phrases and formulations in the language commonly used by the user.

3. The method of claim 2, wherein the speaker recognition data is updated while performing speech recognition on the speech signal.

4. The method of claim 1, wherein at least one of speaker recognition and speech recognition is performed based on a vocabulary limited to terms relating to a cabin of the aircraft or situations around the cabin of the aircraft.

5. The method of claim 4, wherein the vocabulary is specific to at least one of a user and a user group.

6. A non-transitory computer-readable medium storing instructions executable by a computer processor for signaling speech signal related test messages on board an aircraft, comprising instructions to:

receive a speech signal spoken by a user;

download a plurality of speech recognition profiles from a remote source providing user profiles of airline crew members;

perform speaker recognition on the speech signal to identify the user from the speech signal;

select, among the downloaded plurality of speech recognition profiles, a speech recognition user profile which is associated with the identified user; and perform speech recognition on the speech signal using the selected user profile;

wherein speaker recognition is performed on a first portion of the speech signal to identify the user and speech recognition is performed using the selected user profile retrospectively beginning from the beginning of the first portion of the speech signal and continuing with a remaining portion of the speech signal;

wherein performing speech recognition comprises converting the speech signal into a text message to be displayed to at least one passenger in a cabin of the aircraft; and wherein the text message is sent to a passenger-owned device which has established connectivity to an onboard connectivity system.

7. A speech recognition unit for performing speech recognition on board of an aircraft, wherein the speech recognition unit comprises:

a downloading component configured to download a plurality of speech recognition profiles from a remote source providing user profiles of airline crew members;

a receiving component configured to receive a speech signal spoken by a user;

a speaker recognition component configured to perform speaker recognition on the speech signal to identify the user from the speech signal;

a selecting component configured to select, among the downloaded plurality of speech recognition profiles, a speech recognition user profile which is associated with the identified user; and a speech recognition component configured to perform speech recognition on the speech signal using the selected user profile;

wherein speaker recognition is performed on a first portion of the speech signal to identify the user and speech recognition is performed using the selected user profile retrospectively beginning from the beginning of the first portion of the speech signal and continuing with a remaining portion of the speech signal;

wherein performing speech recognition comprises converting the speech signal into a text message to be displayed to at least one passenger in a cabin of the aircraft; and wherein the text message is sent to a passenger-owned device which has established connectivity to an onboard connectivity system.

\* \* \* \* \*